Figure 1:
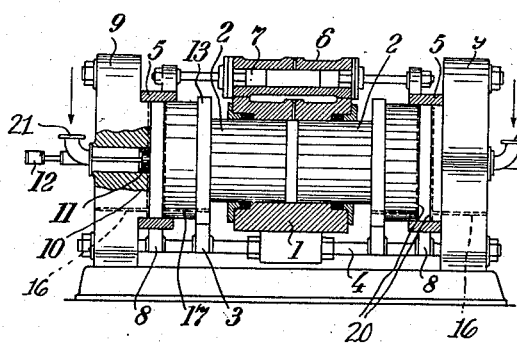

July 21, 1936.                    H. REITZ                    2,048,352
                                FILTER PRESS
                             Filed Nov. 15, 1932

Inventor
Heinrich Reitz.
By  Attorneys

Patented July 21, 1936

2,048,352

UNITED STATES PATENT OFFICE 2,048,352

FILTER PRESS

Heinrich Reitz, Bitterfeld, Germany, assignor to I. G. Farbenindustrie Aktiengesellschaft, Frankfort-on-the-Main, Germany Application November 15, 1932, Serial No. 642,725
In Germany November 16, 1931

4 Claims. (Cl. 100—50)

This invention relates to improvements in or relating to filter presses and more particularly to a combined filter and hydraulic press.

In filter presses of known type, hydraulic cylinders are interposed between the several filter plates, and, after the filtering chamber has been completely filled through openings provided in its circumference, the rams of said cylinders compress the filter cakes in order to separate the solid constituents from the liquid constituents of the charge material as completely as possible. The provision, in an older type, of an annular casing which forms an integral projecting part of the counter-pressure bodies of the press, and constitutes the shell of the filtering chamber and is provided with the openings for charging the latter, has the defect that the removal of the spent filter cakes gives rise to considerable trouble, and also that difficulties are encountered in sealing the means for feeding the charge in relation to the filter chamber. Moreover, experience has shown that only moderate pressure can be applied in filling the filtering chamber, the result being irregular filling and, in many cases, the formation, in front of the intake opening, of cakes which obstruct the admission of any further charge material.

In order to facilitate the removal of the spent filter cake, it has also been proposed to form the shell of the filtering chamber of a movable ring, the end of which bears against the abutment surface of the filter, said ring also serving to guide the press ram or rams. In this type also, the charge material is introduced through openings provided in the shell ring, so that the aforementioned defects recur. Moreover—and especially in the case of fine-grained charges—in order to obtain an effective sealing of the shell ring, the end of which bears against the abutment plate, high pressures are required, which must exceed the filtering pressure exerted on the charge material, and consequently the shell ring adapted to slide over the ram must be of very stout construction. Even then, there is no guarantee that some of the charge material or expressed liquid will not be forced through the joints and be wasted.

The present invention aims at obviating the foregoing defects of filter presses of the known types. To this end, the invention provides a construction of filter and hydraulic press in which the filtering chamber, which is preferably provided with filtering surfaces at both ends, is formed by a collar, which not only serves to guide the press ram in known manner, but is also adapted to slide over the head member serving as abutment. In a preferred embodiment of the invention, the charge material is introduced into the filtering chamber through the head member or members instead of the collar forming the circumference of the filtering chamber. Owing to this type of construction, the sealing pressure is taken up by the strength of the collar, so that the application of a closing pressure to the collar is no longer required.

Figure 2:
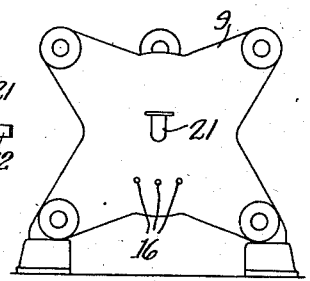

In order more clearly to understand the invention, reference is made to the accompanying drawing which illustrates diagrammatically and by way of example, an embodiment of a filter press in accordance therewith, and in which Fig. 1 is a longitudinal section; and Fig. 2 a front elevation of one embodiment of double-acting press.

Referring to Figs. 1 and 2, 2 denotes hydraulically actuated rams which are fitted closely into the press cylinder 1 and are guided, by means of slides 3, on the tie rods 4 of the head members. Collars 5 adapted to slide on the tie-rods 4 by means of slides 8 are hydraulically reciprocated by pistons 7 fitting in a cylinder 6 which is arranged parallel to cylinder 1. The inner face of each head 9 is provided with an integral extension 10 over which a collar 5 is adapted to slide. Through the force imparted by pistons 7 to collars 5, the collars are placed in sealing engagement with the peripheries of said extensions while the outer ends of the collars are placed in sealing engagement with the inner faces of said heads. As shown in Fig. 1 each ram 2 is adapted to slide within a collar 5 and to make sealing engagement therewith. The heads 9, rams 2 and collars 5 therefore cooperate to define the filtering chambers. In this set up the pistons 7 have merely to overcome the friction of the sliding collars 5 over their bearing surfaces whilst the pressure of the press is absorbed by the specific strength of the collars. Each ram 2 is provided with a projection 13 which is adapted to be contacted by collars 5 upon the collars being retracted to expose the filter cake, so that further inward movement of the collars causes a retraction of the rams 2. The ram surfaces forming one end of each filtering chamber, and also the surfaces of the extensions 10, are provided with filters 20. The charge material is introduced via passages 21 which extend through heads 9, into the filtering chambers through valves 11 which are preferably actuated by hydraulic controls 12. The filtrate is withdrawn through passages 16 and 17.

The filter press operates in the following manner.

By opening the valve which actuates the closing rams 7, the collars 5 are moved into sealing contact with the head members 9, thereby fitting closely round extensions 10. The inlet valve 11 to the filtering chamber is now opened by means of the control 12, thus filling the chamber with charge material. The rams 2 are next actuated, so that the expressed, filtered liquid passes through the filtering surfaces 20 and issues at 16 and 17. The outflow may be assisted by the application of a vacuum. When the pressing has terminated, the collars 5 are drawn back over the rams 2 and, on coming into contact with the projections 13, return the rams 2 to their original position. The spent filter cakes are now exposed, and can be easily removed from the press by loosening them, preferably with the aid of compressed air acting through the filtering surface.

I claim:—

1. A filter press comprising a base, a head at opposite ends thereof rigidly secured to the base, said heads having integral extensions thereon directed inwardly toward each other and in alignment, a collar in sliding and sealing engagement with the periphery of said extensions, the end face of each collar being adapted to be moved into sealing engagement with an inner face of a head, the collars being in alignment, hydraulically operated means operatively connected to each collar for reciprocating the same, a ram slidably and sealingly engaged with the inner surface of each collar to form therewith and with the head a filtering chamber, hydraulically operated means positioned parallel to the first named hydraulic means and adapted to reciprocate the rams, filters mounted on the inner face of the extension and the outer face of the ram in facing relation to each other, means for the entry of a primary fluid to said chamber and another means to permit exit of a secondary fluid and means for operating the collar and ram in proper sequence, said collar being moved over said ram and then with the ram to release the press cake after a pressing operation has been completed.

2. A filter press comprising a base, a head at opposite ends thereof rigidly secured to the base, said heads having integral extensions thereon directed inwardly toward each other and in alignment, a collar in sliding and sealing engagement with the periphery of said extensions, the end face of each collar being adapted to be moved into sealing engagement with an inner face of a head, the collars being in alignment, hydraulically operated means operatively connected to each collar for reciprocating the same, a ram slidably and sealingly engaged with the inner surface of each collar to form therewith and with the head a filtering chamber, hydraulically operated means positioned parallel to the first named hydraulic means and adapted to reciprocate the rams, filters mounted on the inner face of the extension and the outer face of the ram in facing relation to each other, means for the entry of a primary fluid to said chamber and another means to permit exit of a secondary fluid, means for operating the collar and ram in proper sequence and means on said ram adapted to be contacted by said collar upon the inward movement of said collar whereby the further inward movement of said collar retracts said ram.

3. A device as defined in claim 2 wherein said means on said ram which is contacted by said collar comprises an integral projection on said ram.

4. A filter press comprising a base, a head at opposite ends thereof rigidly secured to the base, said heads having integral extensions thereon directed inwardly toward each other and in alignment, a collar in sliding and sealing engagement with the periphery of said extensions, the end face of each collar being adapted to be moved into sealing engagement with an inner face of a head, the collars being in alignment, hydraulically operated means operatively connected to each collar for reciprocating the same, a ram slidably and sealingly engaged with the inner surface of each collar to form therewith and with the head a filtering chamber, hydraulically operated means positioned parallel to the first named hydraulic means and adapted to reciprocate the rams, filters mounted on the inner face of the extension and the outer face of the ram in facing relation to each other, means for the entry of a primary fluid to said chamber and another means to permit exit of a secondary fluid, said hydraulic means operating the collar and ram in proper sequence, and said collar being moved over and actuating said ram whereby the press cake is exposed for removal upon retraction of said ram.

HEINRICH REITZ.